United States Patent [19]

Miyake et al.

[11] Patent Number: 4,902,103

[45] Date of Patent: Feb. 20, 1990

[54] COLOR LIQUID-CRYSTAL DISPLAY UNIT WITH ELECTRODES INTERLEAVED IN VERTICAL AND HORIZONTAL DIRECTIONS

[75] Inventors: Kazuyuki Miyake; Atsuhiko Murata; Yuji Yoshimoto, all of Shizuoka, Japan

[73] Assignee: Koito Manufacturing Co., Ltd., Tokyo, Japan

[21] Appl. No.: 230,804

[22] Filed: Aug. 10, 1988

[30] Foreign Application Priority Data

Aug. 10, 1987 [JP] Japan ............................ 62-198309

[51] Int. Cl.⁴ .............................................. G02F 1/13
[52] U.S. Cl. .................................. 350/336; 350/339 F
[58] Field of Search ............... 350/336, 339 F, 350 S, 350/392

[56] References Cited

U.S. PATENT DOCUMENTS

| | | | |
|---|---|---|---|
| 4,389,095 | 6/1983 | Teshima et al. | 350/336 |
| 4,579,424 | 4/1986 | Matsukawa et al. | 350/339 F |
| 4,697,886 | 10/1987 | Ito et al. | 350/339 F |
| 4,712,874 | 12/1987 | Sekimura et al. | 350/350 S |
| 4,778,257 | 10/1988 | Takamatsu et al. | 350/336 X |
| 4,805,994 | 2/1989 | Miyajima | 350/336 |

FOREIGN PATENT DOCUMENTS

| | | | |
|---|---|---|---|
| 0017049 | 2/1979 | Japan | 350/336 |
| 0165819 | 10/1982 | Japan | 350/336 |
| 59-222877 | 12/1984 | Japan | |
| 0102627 | 5/1986 | Japan | 350/336 |
| 61-267004 | 11/1986 | Japan | |
| 62-58219 | 3/1987 | Japan | |

OTHER PUBLICATIONS

"A Full Color Matrix Liquid-Crystal Display with Color Layers on the Electrodes", Uchida et al, IEEE Transactions on Electron Devices, vol. ED-30, No. 5, May, 1983, pp. 503–507.

"Multicolored Liquid Crystal Displays", Uchida, Optical Engineering, vol. 23, No. 3, Sendai, Japan, May/Jun. 1984, pp. 247–252.

Primary Examiner—Andrew J. James
Assistant Examiner—Napoleon Thantu
Attorney, Agent, or Firm—Sughrue, Mion, Zinn, Macpeak & Seas

[57] ABSTRACT

A color liquid crystal display unit having improved resolution with good color mixing and little directivity. The display unit includes upper and lower light-transmissible substrates disposed in opposition to one another, scanning and signal electrodes formed on opposed surfaces of the substrates, color filters formed at a predetermined repetition interval on the signal electrodes, and a liquid crystal enclosed between the upper and lower substrates. At least one of the signal electrodes is divided into plural portions, and at least a portion of another signal electrode is interleaved therewith.

7 Claims, 6 Drawing Sheets

COLOR LIQUID-CRYSTAL DISPLAY UNIT WITH ELECTRODES INTERLEAVED IN VERTICAL AND HORIZONTAL DIRECTIONS

BACKGROUND OF THE INVENTION

The present invention relates to a color liquid-crystal display unit having color filters disposed in a liquid-crystal element.

FIGS. 1A and 1B show an example of a conventional color liquid-crystal display unit of the same general type to which the invention pertains, of which FIG. 1A is a plan view showing a main portion of the display unit, FIG. 1B is a sectional view taken along a line A-A' in FIG. 1A, and FIG. 1C is a sectional view taken along a line B-B' in FIG. 1A. In these drawings, a liquid-crystal display element 9 is provided in which a plurality of belt-like scanning electrodes 3 and a plurality of belt-like signal electrodes 4, each made of a transparent conductive film, are arranged on respective opposite surfaces of an upper substrate 1 and a lower substrate 2, each made of a light-transmissible glass plate, such that the scanning electrodes 2 and the signal electrodes intersect perpendicularly to each other. Rubbing-treated liquid-crystal orientation films 5 are formed on the surfaces of the scanning electrodes 3 and the signal electrodes 4, respectively. Tri-color filters 6R, 6G, and 6B, for example, of red, green, and blue colors are formed on the signal electrodes 4 succeedingly at a fixed repetition interval. The upper and lower substrates 1 and 2 are separated by a predetermined gap and are sealed at the their peripheral portions by a sealing material 7 including spacers to thereby form an enclosure in which a TN (twisted nematic) liquid crystal 8 is enclosed. Further, a pair of upper and lower polarization plates 10 and 11 with their polarizing axes or light-absorbing axes arranged parallel to each other are adhesively attached to the upper and lower substrates 1 and 2 at their outer surfaces. A color liquid-crystal display unit is thereby formed.

In the thus-arranged color liquid-crystal display unit, when, for example, red color is to be displayed, a predetermined voltage is applied across the signal electrode provided with the red filter thereon and the opposing signal electrode to thereby change the optical property of the TN liquid crystal 8 to allow the light incident on a liquid-crystal portion corresponding to the red filter 6R to pass so that a pattern of red can be seen from the front side of the upper substrate 1. A green display pattern and a blue display pattern can be similarly produced. White display can be effected by applying a predetermined voltage simultaneously across the signal electrodes and the scanning electrodes corresponding to the red filter 6R, the green filter 6G, and the blue filter 6B, respectively. Thus, combinations of color filters of various colors enables a variety of color displays.

In the thus-arranged color liquid-crystal display unit, however, the color filters 6R, 6G, and 6B form patterns elongated in one direction, as shown in FIG. 1A, and hence there has been a problem in that since a color picture displayed on a display screen is composed of a longitudinally elongated dot arrangement, the resolution and clarity of the picture are often insufficient and a desired color mixing effect cannot be obtained.

In order to solve such a problem, for example, in the case where four-color display of red, green, yellow, and black is carried out through additive mixture of color stimuli by use of two color filters 6R and 6G of red and green as shown in FIG. 2, there has been proposed a color liquid-crystal display unit in which the ratio of the areas of the electrode patterns of adjacent signal electrodes 4 are made different from each other. In such an arrangement, because the red and green filter 6R and 6G differ from each other in area ratio, the displayed color picture does not have the longitudinally elongated dot arrangement, and the unit size of one color in the two-color display is substantially the same as that of the other color, resulting in a balanced display and a desired color mixing effect. On the other hand, however, there has been a problem in that as the number of the signal electrodes 4 is increased, the number of electrode lead-out terminals is increased and the interval between adjacent terminals must be reduced. Thus, electrical connection with a driving circuit substrate becomes difficult, resulting in a lowering of the reliability of the device.

SUMMARY OF THE INVENTION

The present invention has been attained in view of the problems in the prior art as described above, and an object thereof is to provide a color liquid-crystal display unit in which a high-quality color picture having a desired color mixing effect and little directivity of dots is obtained without increasing the number of electrode lead-out terminals for the signal electrodes.

In satisfaction of the above and other objects, in a color liquid-crystal display unit according to the present invention, at least one signal electrode is constituted by a plurality of electrode portions, and at least one of the electrode portions is interposed between adjacent ones of the signal electrodes.

That is, according to the present invention, since at least one of the signal electrodes is constituted by a plurality of electrode portions and at least one of the electrode portions is interposed between adjacent ones of the signal electrodes, the number of signal lead-out terminals is not changed, the respective electrode portions are interleaved with each other, and color filters of respective colors are arranged similarly to the arrangement of the electrode portions, resulting in an improvement in additive mixture of color stimuli.

BRIEF DESCRIPTION OF THE DRAWINGS

FIGS. 1A-1C show an example of a conventional color liquid-crystal display unit, of which FIG. 1A is a plan view showing a main portion thereof, FIG. 1B is a sectional view taken along a line A-A' in FIG. 1A, and FIG. 1C a sectional view taken along a line B-B' in FIG. 1A;

FIGS. 3A and 3B show a first embodiment of a color liquid-crystal unit according to the present invention, of which FIG. 3A is a plan view showing a main portion thereof and FIG. 3B is a sectional view taken along a line A-A' in FIG. 3A;

DESCRIPTION OF THE PREFERRED EMBODIMENTS

Figure 1A:
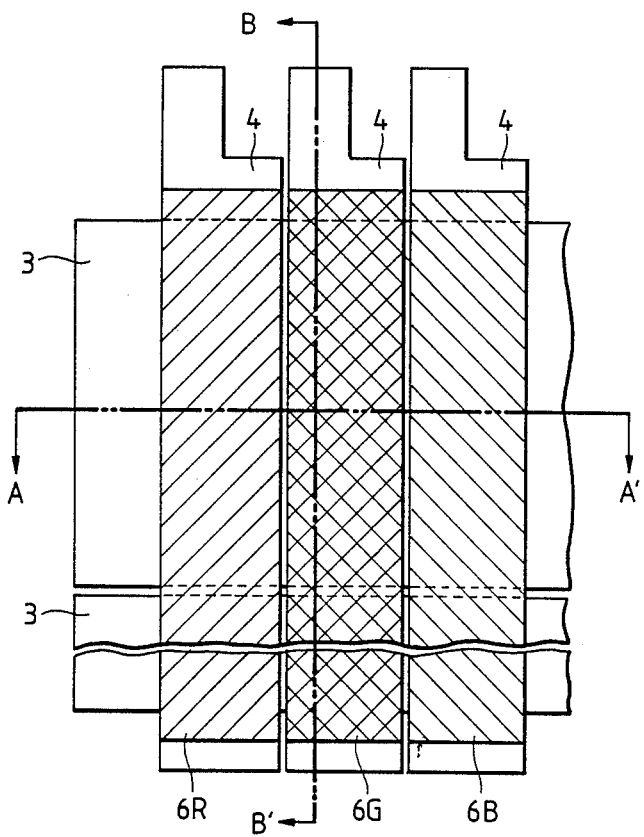
Figure 1C:
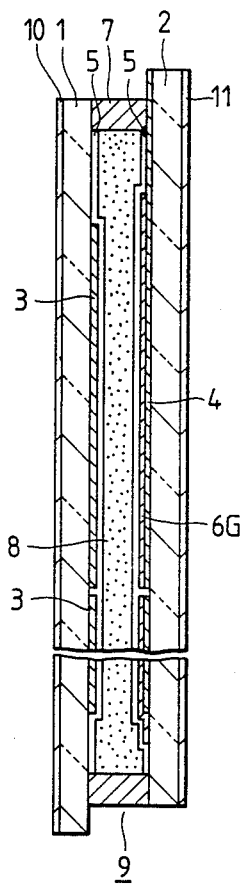
Figure 1B:
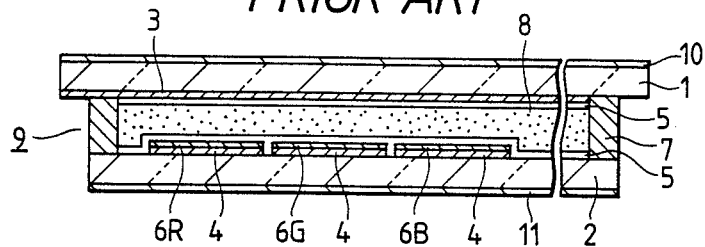
Figure 2:
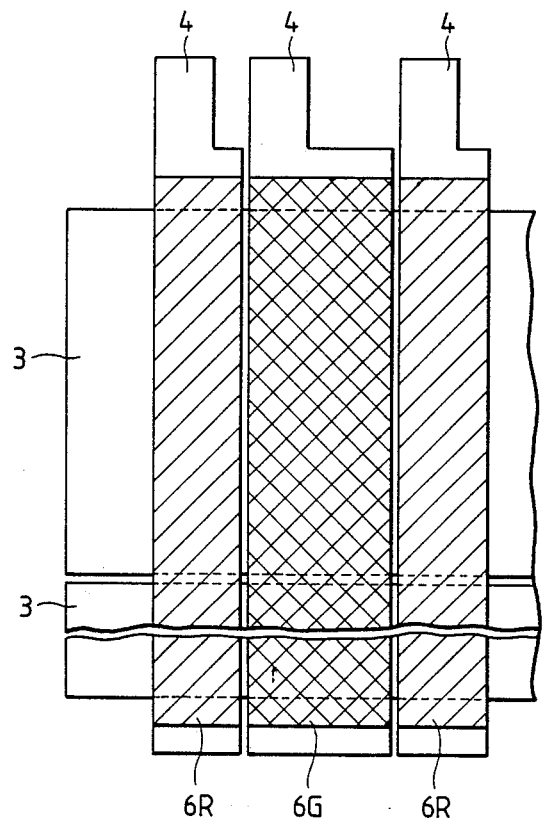
FIG. 2 is a plan view showing a main portion of another example of a conventional liquid-crystal display unit.

Referring to the drawings, preferred embodiments of the present invention will be described in detail hereunder.

Figure 3A:
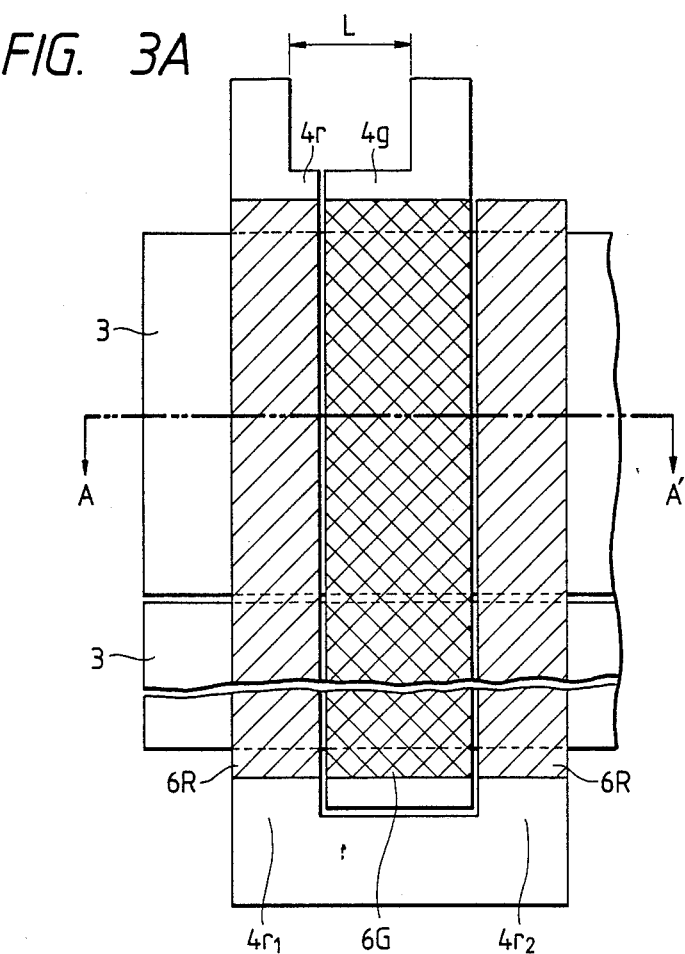
Figure 3B:
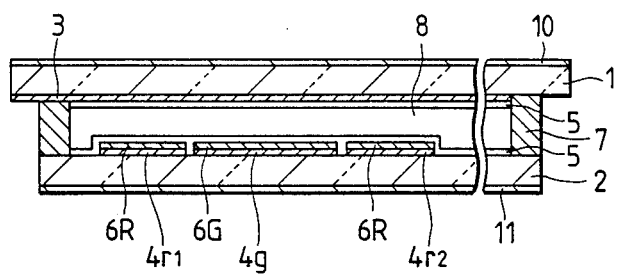

FIGS. 3A and 3B show a preferred embodiment of the present invention applied to a color liquid-crystal unit for performing four-color display using two color filters through additive mixture of color stimuli, of which FIG. 3A is a plan view showing a main portion of one picture element and FIG. 3B a sectional view thereof taken along a line A-A' in FIG. 3A. In FIGS. 3A and 3B, parts which are the same as or corresponding to those in the drawings described above are correspondingly referenced.

In FIGS. 3A and 3B a plurality of scanning electrodes 3 are formed extending in one direction (transverse direction) so as to be arranged parallel to one another on an upper substrate 1. A lower substrate 2 is provided in opposition to the scanning electrodes 3 and a pair of signal electrodes $4_r$ and $4_g$ corresponding to red and green colors respectively, are formed at regular intervals in the other direction (longitudinal direction) on the lower substrate 2. The signal electrode $4_r$ corresponding to red, is constituted by a first electrode portion $4_{r1}$ and a second electrode portion $4_{r2}$ which are formed integrally with each other in a substantially U shape so as to surround the signal electrode $4_g$ corresponding to green. In other words, the signal electrode $4_g$ corresponding to green is interposed between the first and second electrode portions $4_{r1}$ and $4_{r2}$ of the signal electrode $4_r$ corresponding to red. Further, color filters 6R and 6G respectively for red and green are disposed at fixed intervals on the signal electrodes $4_r$ and $4_g$ at their surfaces opposing the scanning electrodes 3, thereby constituting a color liquid-crystal display unit which can display in four colors through the additive mixture of color stimuli.

The signal electrodes $4_r$ and $4_g$ can easily be formed using a well-known evaporation method or sputtering method used for forming an ordinary transparent conductive film. Further, the color filters 6R and 6G for the respective colors can be similarly easily formed through a screen printing method or a dyeing method used for forming an ordinary color filter.

According to such an arrangement, because the signal electrode $4_r$ corresponding to red is constituted by the first and second electrode portions $4_{r1}$ and $4_{r2}$ substantially in a U-shape with the signal electrode $4_g$ corresponding to green interposed between the electrode portions $4_{r1}$ and $4_{r2}$, only one electrode lead-out terminal suffices for each of the signal electrodes $4_r$ and $4_g$; that is, two electrode lead-out terminals suffice in total. Further, because the red filters 6R surround the green filter 6G in forming each picture element, not only is it possible to realize a color filter arrangement which is superior in color mixing effect and in which the picture elements have a little directivity, but the interval L between the electrode lead-out terminal for the signal electrode $4_r$ corresponding to red and the electrode lead-out terminal for the signal electrode $4_g$ corresponding to green is increased so as to facilitate electrical connection to a driving circuit substrate (not shown).

Figure 4:
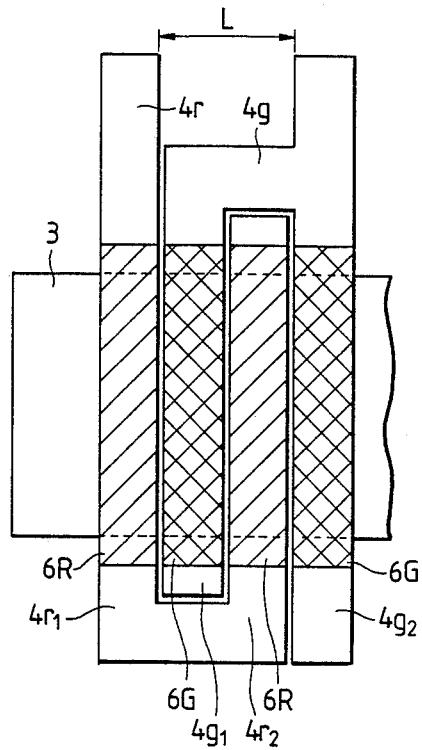
FIGS. 4 and 5 are plan views showing respective main portions of other embodiments of a color liquid-crystal display unit according to the present invention.

FIG. 4 is a plan view showing a main portion of another embodiment of a color liquid crystal display unit constructed according to the present invention. In FIG. 4, parts which are the same as or correspond to those in the above-described drawings are correspondingly referenced.

The embodiment of FIG. 4 differs from the first described embodiment in that a signal electrode $4_g$ corresponding to green is formed substantially in a U shape so as to define a first electrode portion $4_{g1}$ and a second electrode portion $4_{g2}$. The first electrode $4_{g1}$ is interposed between first and second electrode portions $4_{r1}$ and $4_{r2}$ of a signal electrode $4_g$ corresponding to green.

Figure 5:
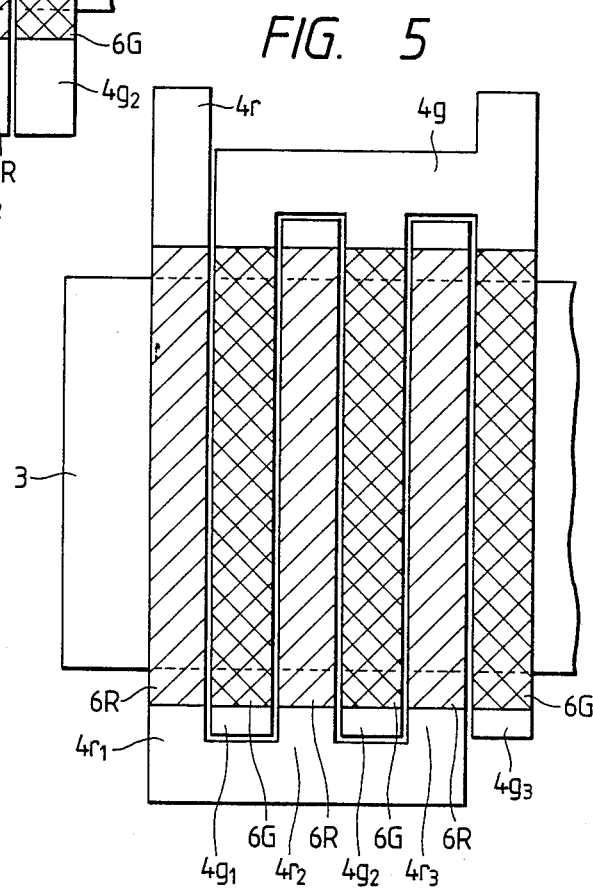

FIG. 5 is a plan view showing a main portion of a further embodiment of a color liquid-crystal display unit according to the present invention. In FIG. 5 parts which are the same as or corresponding to those in the above-described drawings are correspondingly referenced.

The embodiment of FIG. 5 differ from that of FIGS. 3A and 3B in that a signal electrode $4_r$ corresponding to red is formed in a substantially W shape so as to define a first electrode portion $4_{r1}$, a second electrode portion $4_{r2}$, and a third electrode portion $4_{r3}$. Similarly to this, a signal electrode $4_g$ corresponding to green is also formed substantially in a W shape so as to provide a first electrode portion $4_{g1}$, a second electrode portion $4_{g2}$, and a third electrode portion $4_{g3}$. The first electrode portion $4_{g1}$ of the signal electrode $4_g$ corresponding to green is interposed between the first and second electrode portions $4_{r1}$ and $4_{r2}$ of the signal electrode $4_r$ corresponding to red, and the second electrode portion $4_{g2}$ of the signal electrode $4_g$ corresponding to green is interposed between the second electrode portion $4_{r2}$ and third electrode portion $4_{r3}$ of the signal electrode $4_r$ corresponding to red so that the two signal electrodes $4_r$ and $4_g$ are combined with each other at their electrode portions. Red filters 6R are formed on the respective electrode portions $4_{r1}$, $4_{r2}$, and $4_{r3}$ of the signal electrode $4_r$ corresponding to red, while green filters 6G are formed on the respective electrode portions $4_{g1}$, $4_{g2}$, and $4_{g3}$ of the signal electrode $4_g$ corresponding to green.

In such an arrangement, the same effects as in the foregoing embodiments are obtained, and the color filter arrangement is such that the respective electrode portions of the signal electrodes $4_r$ and $4_g$ are interleaved with each other so that the additive mixture of color stimuli can be further improved.

Figure 6:
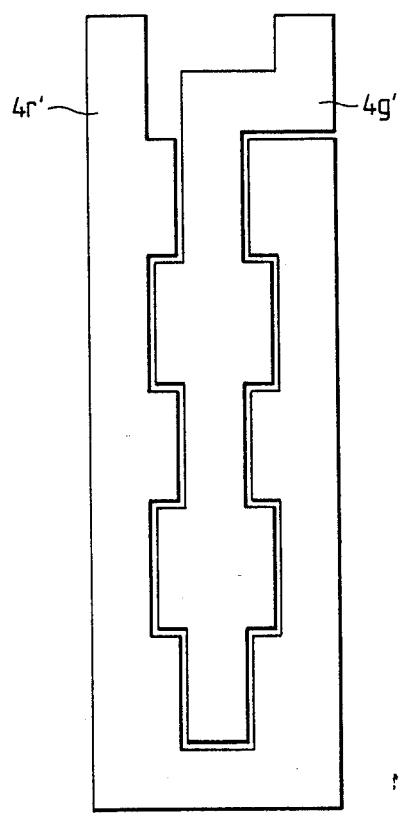
FIGS. 6 and 7A-7C are plan views showing respective main portions of signal electrodes and color filters for explaining further embodiments of a color liquid-crystal display unit according to the present invention.
Figure 7A:
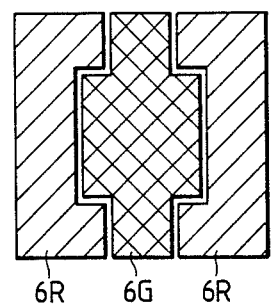
Figure 7B:
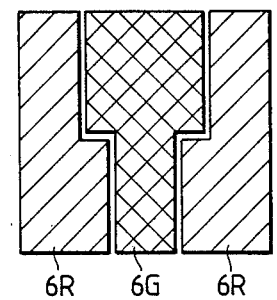
Figure 7C:
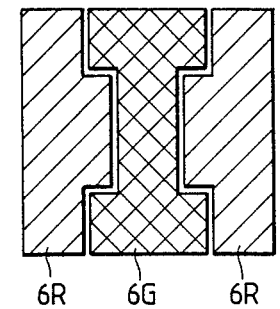

FIGS. 6 and 7A-7C are views provided for explaining a further embodiment of a color liquid-crystal display unit according to the present invention. As shown in FIG. 6, signal electrodes $4_{r'}$ and $4_{g'}$, corresponding to red and green, respectively, are formed on an lower substrate such that wide electrode pattern portions of the former and narrow electrode pattern portions of the latter and narrow electrode pattern portions of the former and wide electrode pattern portions of the latter are alternately combined with each other continuously in the longitudinal direction. Red filters 6R and green filters 6G having pattern shapes substantially equivalent to those of the signal electrodes $4_{r'}$ and $4_{g'}$ as shown in FIGS. 7A-7C are formed at a regular repetition interval on the signal electrodes $4_{r'}$ and $4_{g'}$.

Figure 8:
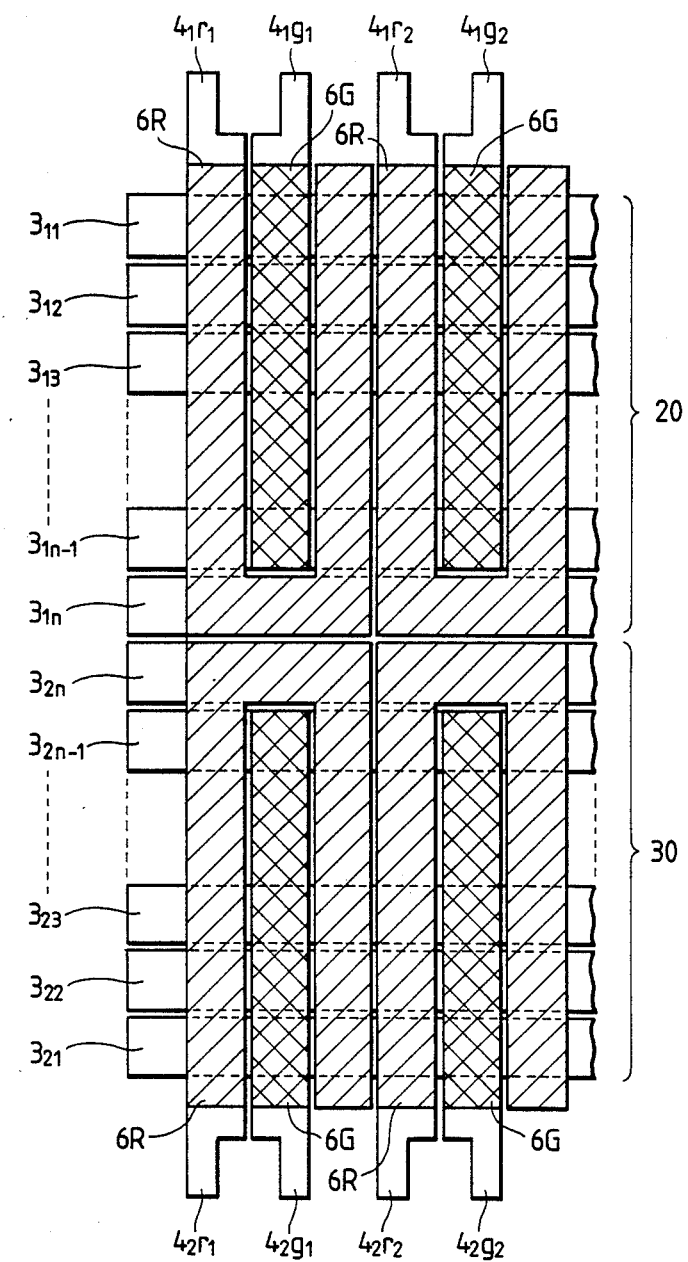
FIG. 8 is a plan view showing a main portion of a still further embodiment of a color liquid-crystal display unit according to the present invention.

FIG. 8 is an enlarged plan view showing a main portion of a still further embodiment of the color liquid-crystal display unit according to the present invention. In FIG. 8, the same parts as those described in the foregoing drawings are correspondingly referenced.

In FIG. 8, scanning and signal electrodes 3 and 4 are divided vertically in the drawing into two (upper and lower) sections. Upper scanning electrodes $3_{11}, \ldots, 3_{1n}$ and upper signal electrodes $4_{1r1}, 4_{1g1}, 4_{1r2}, 4_{1g2}, \ldots$ in the upper section are arranged in a matrix, and red filters 6R and green filters 6G are formed at a fixed repetition interval on the upper signal electrodes $4_{1r1}, 4_{1g1}, 4_{1r2}, 4_{1g2}, \ldots$ to form an upper display portion 20. Lower scanning electrodes $3_{21}-3_{2n}$ and lower signal electrodes $4_{2r1}, 4_{2g1}, 4_{242}, 4_{2g2}, \ldots$ included in the lower section are arranged in a matrix, and red filters 6R and green filters 6G are formed at a fixed repetition interval on the lower signal electrodes $4_{2r1}, 4_{2g1}, r_{2r2}, 4_{2g2}, \ldots$ to form a lower display portion.

Effects similar to those of the foregoing embodiments are obtained. Further, since the patterns of the red and green filters 6R and 6G are not a simple stripe shape but both the filters are formed in longitudinally alternately crossing shapes, the directivity of the color display pattern is further reduced and color mixing further improved. Thus, a display picture superior in color balance can be obtained.

As described above, according to the present invention, since at least one of the signal electrodes is constituted by a plurality of electrode portions and at least one of the electrode portions is interposed between adjacent ones of the electrode portions of the signal electrodes, the number of electrode lead-out terminals of the signal electrodes is not increased and the interval between terminals is large. Accordingly, superior effects are obtained in that not only can the signal electrodes and the driving circuit substrate be easily electrically connected to each other so as to improve reliability, but a high quality color picture having less directivity in picture elements and having a preferable color-mixture effect is provided.

What is claimed is:

1. A color liquid-crystal display unit comprising: upper and lower light-transmissible substrates disposed in opposition to each other; a plurality of scanning and signal electrodes formed in a matrix pattern on said upper and lower substrates on respective surfaces thereof opposing one another; color filters for predetermined colors formed at a predetermined repetition interval on at least one of upper and lower surfaces of said signal electrodes, intersecting portions of said scanning and signal electrodes on which said color filters are formed defining picture elements, in each of said picture elements a first of said signal electrodes having portions interleaved with a second of said signal electrodes in both horizontal and vertical directions; and a liquid crystal enclosed between said upper and lower substrates.

2. The color liquid-crystal display unit of claim 1, wherein said first electrode has substantially a U shape in each of said picture elements with said second electrode interposed between sides of the U.

3. The color liquid-crystal display unit of claim 2, wherein said second electrode in each of said picture elements has first and second portions of different widths.

4. The color liquid-crystal display unit of claim 1, wherein said second electrode in each of said picture elements has first and second portions of different widths, said first electrode having first and second separated portions, said second electrode in each of said picture elements being interposed between said first and second separated portions of said first electrode.

5. The color liquid-crystal display unit of claim 4, wherein said second electrode has relatively wide end portions and a relatively narrow central portion joining said relatively wide end portions.

6. The color liquid-crystal display unit of claim 4, wherein said second electrode has relatively narrow end portions and a relatively wide central portion joining said relatively wide end portions.

7. The color liquid-crystal display unit of claim 4, wherein said one end of said second electrode is relatively narrow and the other end of said second electrode is relatively wide.

* * * * *